US010780828B2

(12) United States Patent
Higashimachi et al.

(10) Patent No.: US 10,780,828 B2
(45) Date of Patent: Sep. 22, 2020

(54) SENSOR MOUNT STRUCTURE

(71) Applicant: TOYOTA JIDOSHA KABUSHIKI KAISHA, Toyota-shi, Aichi-ken (JP)

(72) Inventors: Naoya Higashimachi, Toyota (JP); Hiroaki Ito, Toyota (JP); Koh Mizutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/172,257

(22) Filed: Oct. 26, 2018

(65) Prior Publication Data

US 2019/0168671 A1 Jun. 6, 2019

(30) Foreign Application Priority Data

Dec. 6, 2017 (JP) .................. 2017-234429

(51) Int. Cl.
| | |
|---|---|
| *B60Q 1/00* | (2006.01) |
| *B60R 1/04* | (2006.01) |
| *B60R 11/04* | (2006.01) |
| *B60R 1/12* | (2006.01) |
| *B60K 35/00* | (2006.01) |
| *B60R 11/00* | (2006.01) |

(52) U.S. Cl.
CPC ................ *B60R 1/04* (2013.01); *B60K 35/00* (2013.01); *B60R 1/12* (2013.01); *B60R 11/04* (2013.01); *B60R 2001/1215* (2013.01); *B60R 2001/1253* (2013.01); *B60R 2011/0033* (2013.01)

(58) Field of Classification Search
CPC ........... B60K 35/00; B60R 11/04; B60R 1/04; B60R 1/12; B60R 2001/1215; B60R 2001/1253; B60R 2011/0033

USPC .......................................................... 340/461
See application file for complete search history.

(56) References Cited

U.S. PATENT DOCUMENTS

| | | | | |
|---|---|---|---|---|
| 6,250,148 B1 * | 6/2001 | Lynam | ...................... | B60R 1/04 |
| | | | | 73/170.17 |
| 6,313,454 B1 * | 11/2001 | Bos | ........................ | B60N 2/002 |
| | | | | 250/208.1 |
| 6,326,613 B1 * | 12/2001 | Heslin | ...................... | B60R 1/04 |
| | | | | 250/214 AL |
| 6,824,281 B2 * | 11/2004 | Schofield | ................ | B60R 11/04 |
| | | | | 359/876 |

(Continued)

FOREIGN PATENT DOCUMENTS

JP        2003-48491 A       2/2003

*Primary Examiner* — Naomi J Small
(74) *Attorney, Agent, or Firm* — Oliff PLC

(57) ABSTRACT

A sensor mount structure, including: a sensor device that detects information regarding at least a region ahead of a vehicle; a display device that displays images of at least a region behind the vehicle; a support member that covers a part of the sensor device from below and that is attached to a base member provided at an inner surface of a front windshield glass; an arm member that has an upper end portion attached to the support member and a lower end portion attached to a length direction center portion of the display device; and a cover member, a minimum distance between the cover member and an upper peripheral edge at a length direction end portion of the display device being longer than a minimum distance between the cover member and an upper peripheral edge at the length direction center portion of the display device.

9 Claims, 13 Drawing Sheets

(56) References Cited

U.S. PATENT DOCUMENTS

| | | | | |
|---|---|---|---|---|
| 8,637,801 B2* | 1/2014 | Schofield | ............ | G06K 9/2018 250/208.1 |
| 2002/0003571 A1* | 1/2002 | Schofield | ............ | B60R 11/0235 348/148 |
| 2004/0232773 A1* | 11/2004 | Parker | ............ | B60R 1/04 307/10.1 |
| 2009/0010494 A1* | 1/2009 | Bechtel | ............ | G01S 11/12 382/104 |

* cited by examiner

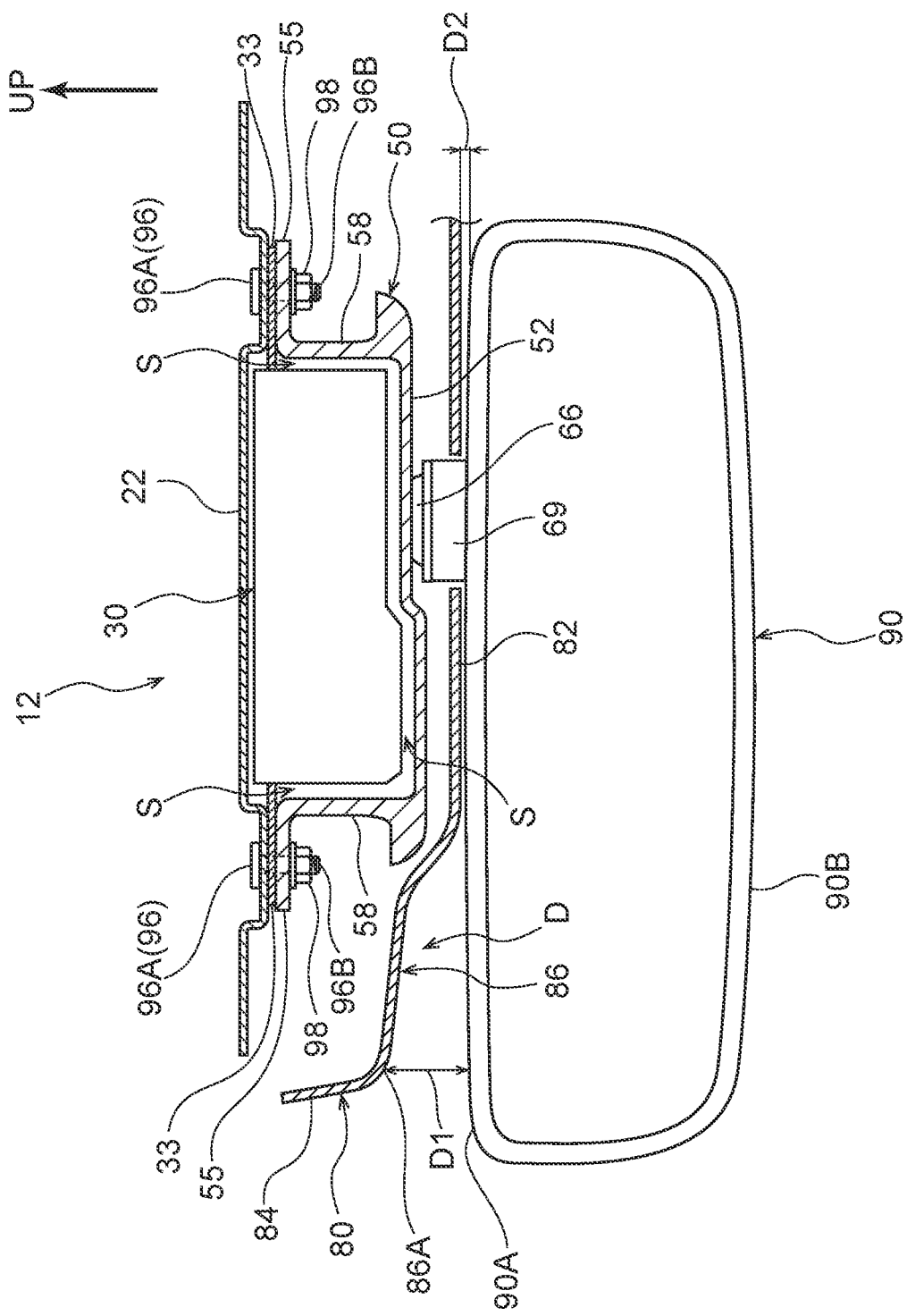

SENSOR MOUNT STRUCTURE

CROSS-REFERENCE TO RELATED APPLICATION

This application is based on and claims priority under 35 USC 119 from Japanese Patent Application No. 2017-234429 filed on Dec. 6, 2017, the disclosure of which is incorporated by reference herein.

BACKGROUND

Technical Field

The present disclosure relates to a sensor mount structure.

Related Art

Structures have been proposed in which, when a camera is provided at an upper portion of an inner surface of a front windshield glass in order to assist driving by capturing images of the environment ahead of a vehicle, a room mirror (interior mirror) is attached to a lower side of the camera in order to both secure the fields of vision of the camera and the driver, and to secure the field of vision of the room mirror (see, for example, Japanese Patent Application Laid-Open (JP-A) No. 2003-48491).

An effective way to suppress vibration of the interior mirror (display device) caused by vibration from the traveling vehicle or the like is to shorten the length of an arm member that attaches the interior mirror in a manner allowing the angle of the interior mirror to be adjusted. However, when the arm member is shortened, it becomes difficult to secure a space to allow fingertips to enter at the upper side of an upper peripheral edge of a length direction end portion of the interior mirror in order for the driver or the like to adjust the angle of the interior mirror.

SUMMARY

Thus, an object of the present disclosure is to obtain a sensor mount structure capable of suppressing vibration of a display device during vehicle travel, and capable of securing space to allow entry of fingertips at the upper side of an upper peripheral edge of a length direction end portion of the display device.

In order to achieve the above object, a sensor mount structure of a first aspect of the present disclosure includes a sensor device, a display device, a support member, an arm member, and a cover member. The sensor device detects information regarding at least a region ahead of a vehicle. The display device displays images of at least behind the vehicle. The support member covers a part of the sensor device from below and is attached to a base member provided at an inner surface of a front windshield glass. The arm member has an upper end portion attached to the support member and has a lower end portion attached to a length direction center portion of the display device. The cover member covers the support member. Moreover, a minimum distance between an upper peripheral edge at a length direction end portion of the display device and the cover member is longer than a minimum distance between an upper peripheral edge at the length direction center portion of the display device and the cover member.

In the first aspect of the present disclosure, the upper end portion of the arm member is attached to the support member, the support member being attached to the base member and covering part of the sensor device, which detects information regarding at least a region ahead of the vehicle, from below. The lower end portion of the arm member is attached to the length direction center portion of the display device. The length of the arm member is accordingly reduced in comparison to cases in which the upper end portion of the arm member is directly attached to the base member. Vibration of the display device during vehicle travel is thereby suppressed.

Moreover, the minimum distance between the upper peripheral edge at the length direction end portion of the display device and the cover member is longer than the minimum distance between the upper peripheral edge at the length direction center portion of the display device and the cover member. A space allowing the fingertips to enter at the upper side of the upper peripheral edge at the length direction end portion of the display device is thereby secured.

A sensor mount structure of a second aspect of the present disclosure is the sensor mount structure of the first aspect, wherein the cover member includes a step at a location at which the cover member faces the upper peripheral edge at the length direction end portion of the display device.

In the second aspect of the present disclosure, the cover member includes the step at the location of the cover member facing the upper peripheral edge at the length direction end portion of the display device. Accordingly, the space that allows entry of the fingertips at the upper side of the upper peripheral edge at the length direction end portion of the display device is widened in a vertical direction, such that this space is well-secured.

A sensor mount structure of a third aspect of the present disclosure is the sensor mount structure of the first or second aspect, wherein the support member is formed in a shape of a casing including a bottom wall, and a bracket having a length direction along a vehicle front-rear direction is provided at the bottom wall, and the upper end portion of the arm member is attached to the bracket.

In the third aspect of the present disclosure, the bracket with its length direction along the vehicle front-rear direction is provided at the bottom wall of the case shaped support member, and the upper end portion of the arm member is attached to the bracket. The vehicle front-rear direction rigidity of the bottom wall, including the bracket, is thereby improved, effectively suppressing vehicle front-rear direction vibration of the display device during vehicle travel.

A sensor mount structure of a fourth aspect of the present disclosure is the sensor mount structure of any one of the first to third aspects, wherein the support member is fastened together with the sensor device to the base member.

In the fourth aspect of the present disclosure, the support member that supports the display device is fastened together with the sensor device to the base member. The number of components (fasteners) is thereby reduced in comparison to cases in which the support member is fastened to the base member separately to the sensor device.

A sensor mount structure of a fifth aspect of the present disclosure is the sensor mount structure of the fourth aspect, wherein the support member and the sensor device are fastened to the base member at four points separated from each other in a vehicle front-rear direction and a vehicle width direction.

In the fifth aspect of the present disclosure, the support member and the sensor device are fastened to the base member at the four points separated from each other in the vehicle front-rear direction and the vehicle width direction. The display device is thus more stably supported against vehicle front-rear direction and vehicle width direction vibration than, for example, in cases in which the support member and the sensor device are fastened to the base member at only three points.

A sensor mount structure of a sixth aspect of the present disclosure is the sensor mount structure of any one of the first to fifth aspects, wherein the display device is an electronic interior mirror.

In the sixth aspect of the present disclosure, the display device is an electronic interior mirror. Although the electronic interior mirror is a heavier object than a standard optical mirror, the support member attached to the base member is formed with a shape that covers a part of the sensor device from below, thereby securing support rigidity and stably supporting the electronic interior mirror.

A sensor mount structure of a seventh aspect of the present disclosure is the sensor mount structure of any one of the first to sixth aspects, wherein the cover member covers the support member while circumventing the arm member.

In the seventh aspect of the present disclosure, the cover member covers the support member while circumventing the arm member. Accordingly, the shape of the cover member is simplified in comparison to cases in which the cover member also covers the arm member.

A sensor mount structure of an eighth aspect of the present disclosure is the sensor mount structure of any one of the first aspect to the seventh aspect, wherein the sensor device is configured including a sensor employing a camera or an infrared laser beam.

In the eighth aspect of the present disclosure, the sensor device is configured including a sensor employing a camera or an infrared laser beam. Detection performance of surroundings information for the vehicle is thereby improved in comparison to cases in which the sensor device is not configured including a sensor employing a camera or an infrared laser beam.

The first aspect of the present disclosure is capable of suppressing vibration of the display device during vehicle travel, and is also capable of securing a space for entry of the fingertips at the upper side of the upper peripheral edge at the length direction end portion of the display device.

The second aspect of the present disclosure enables the space for entry of the fingertips at the upper side of the upper peripheral edge at the length direction end portion of the display device to be widened in the vertical direction, enabling this space to be well-secured.

The third aspect of the present disclosure is capable of effectively suppressing vehicle front-rear direction vibration of the display device during vehicle travel.

The fourth aspect of the present disclosure is capable of reducing the number of components (fasteners).

The fifth aspect of the present disclosure is capable of stably supporting the display device.

The sixth aspect of the present disclosure is capable of stably supporting the electronic interior mirror, which is a heavy object.

The seventh aspect of the present disclosure enables the shape of the cover member to be simplified.

The eighth aspect of the present disclosure is capable of improving detection performance of surroundings information for the vehicle.

BRIEF DESCRIPTION OF THE DRAWINGS

Exemplary embodiments of the present disclosure will be described in detail based on the following figures, wherein:

FIG. 13 is a schematic rear view sectioned along imaginary line K in FIG. 11, illustrating a sub cover and an electronic interior mirror configuring a sensor mount structure according to an exemplary embodiment.

DETAILED DESCRIPTION

Figure 1:
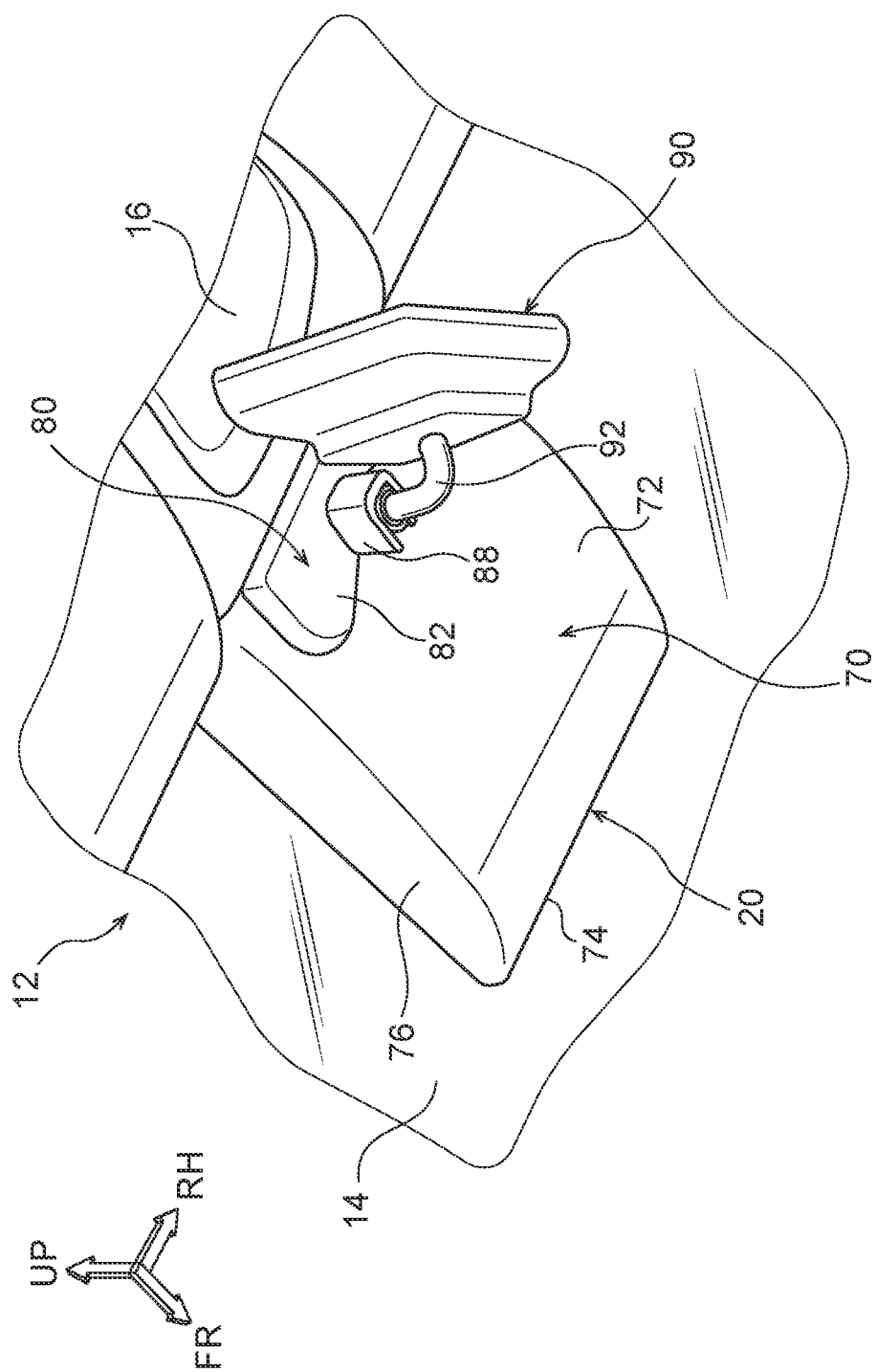
FIG. 1 is a perspective view illustrating a sensor unit provided with a sensor mount structure according to an exemplary embodiment, as viewed from a vehicle cabin side.

Detailed explanation follows regarding an exemplary embodiment according to the present disclosure, with reference to the drawings. Note that for ease of explanation, in the drawings, the arrow UP indicates a vehicle upward direction, the arrow FR indicates a vehicle front direction, and the arrow RH indicates a vehicle right direction, as appropriate. Accordingly, in the following explanation, unless specifically stated otherwise, reference to upward and downward directions, front and rear directions, and left and right directions refers to upward and downward in a vehicle vertical direction, front and rear in a vehicle front-rear direction, and left and right in a vehicle left-right direction (vehicle width direction).

Figure 2:
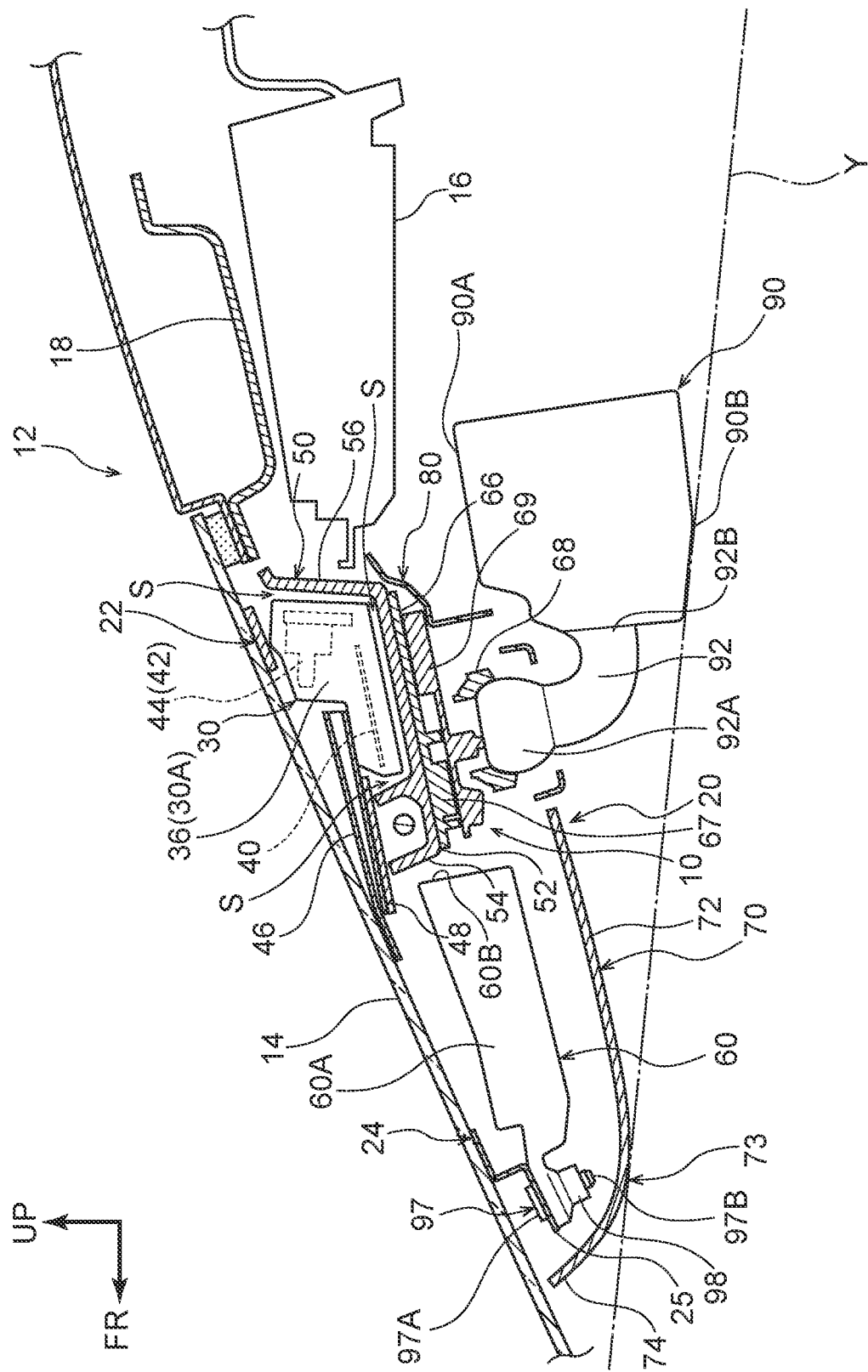
FIG. 2 is a side view cross-section illustrating a sensor mount structure according to an exemplary embodiment.

As illustrated in FIG. 1 and FIG. 2, a sensor unit 20 including a sensor mount structure 10 according to the present exemplary embodiment mounted to a vehicle 12 is provided at an inner surface of a front windshield glass 14 at a vehicle front upper side of an electronic interior mirror 90, serving as an example of a display device that displays images of at least behind the vehicle 12.

Figure 3:
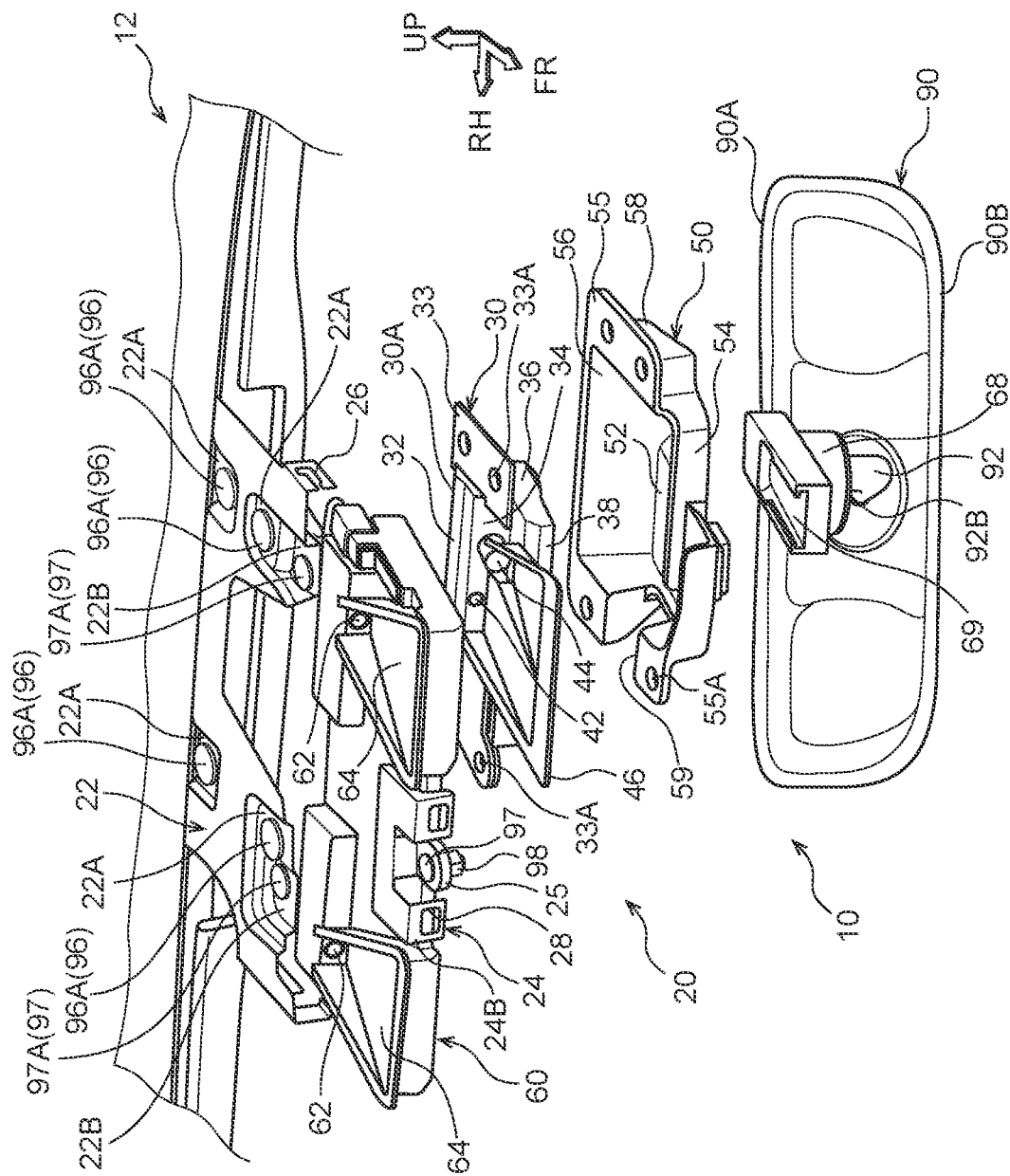
FIG. 3 is an exploded perspective view illustrating part of a sensor unit including a sensor mount structure according to an exemplary embodiment.
Figure 4:
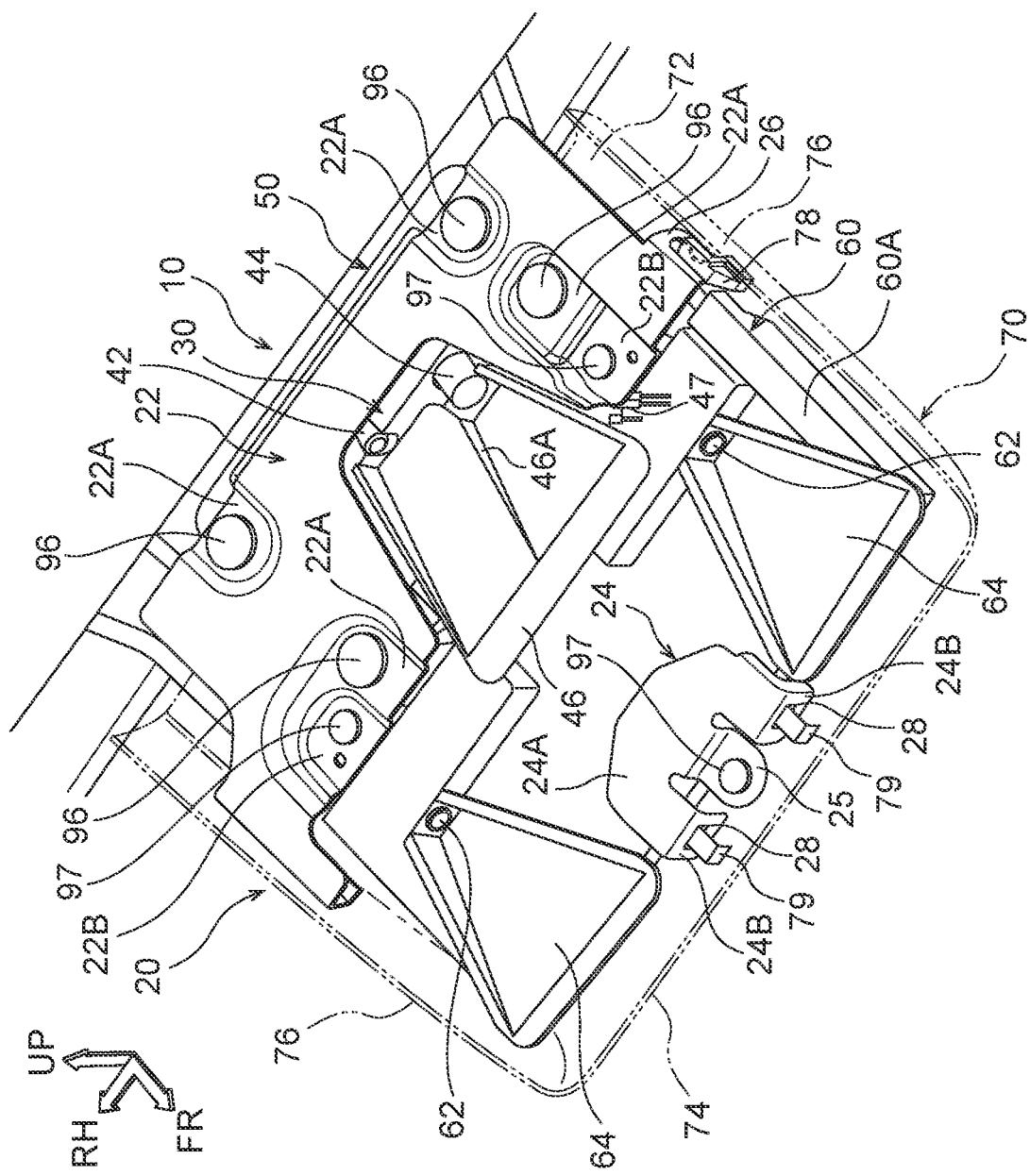
FIG. 4 is a perspective view illustrating sensor mount structure according to an exemplary embodiment as viewed from an upper side of a vehicle.

In more detail, as illustrated in FIG. 3 and FIG. 4, the sensor unit 20 includes a base member 22. A vehicle upper side of the base member 22 is attached to the inner surface of the front windshield glass 14 with an adhesive or the like. The base member 22 is formed from a substantially U-shaped metal sheet in plan view.

Recesses 22A are formed on both left and right sides of a rear end portion of the base member 22. A through hole that has a circular profile in plan view (not illustrated in the drawings) is formed in a bottom face of each recess 22A. A shaft 96B (see FIG. 7, FIG. 8) of a weld bolt 96, serving as a fastener, is inserted through each through hole, and a head 96A of each weld bolt 96 is fixed by welding at the bottom face of the recess 22A at the periphery of the through hole.

Recesses 22A are also formed on both left and right sides of a front portion of the base member 22. A through hole that has a circular profile in plan view (not illustrated in the drawings) is formed in a bottom face of each of these recesses 22A. A shaft 96B of a weld bolt 96 (see FIG. 7, FIG. 8) is inserted through each through hole, and a head 96A of each weld bolt 96 is fixed by welding at the bottom face of the recess 22A at the periphery of the through hole.

These four weld bolts 96 and four nuts 98 (see FIG. 7, FIG. 8) are used to fasten a locator/telephoto camera device 30, described later, to both a housing 50 that houses part of the locator/telephoto camera device 30, and the base member 22 (joint fastening). Namely, the locator/telephoto camera device 30 and the housing 50 are fastened to the base member 22 at four discrete locations (four points) at the front, rear, left, and right.

A recess 22B is formed at a vehicle width direction outer side of the bottom face of the recess 22A formed at a front right portion of the base member 22. A through hole that has a circular profile in plan view (not illustrated in the drawings) is formed in the bottom face of this recess 22B. A shaft 97B (see FIG. 7, FIG. 8) of a weld bolt 97, serving as a fastener with a smaller diameter than that of the weld bolt 96, is inserted through the through hole, and a head 97A of the weld bolt 97 is fixed by welding at the bottom face of the recess 22B at the periphery of the through hole.

A recess 22B is also formed at a vehicle front side of the bottom face of the recess 22A formed at a front left portion of the base member 22. A through hole that has a circular profile in plan view (not illustrated in the drawings) is formed in the bottom face of this recess 22B. A shaft 97B of a weld bolt 97 (see FIG. 7, FIG. 8) is inserted through this through hole, and the head 97A of the weld bolt 97 is fixed by welding at the bottom face of the recess 22B at the periphery of the through hole.

The two weld bolts 97 and two nuts (not illustrated in the drawings) are used to fasten both left and right sides of a rear end portion of a stereo camera device 60, described later, to the base member 22.

Further toward the vehicle front than the base member 22, an upper face 24A of a sub base member 24, this being smaller than the base member 22, is also attached to the inner surface of a substantially vehicle width direction central portion of the front windshield glass 14 using an adhesive or the like. The sub base member 24 is formed from a metal sheet that is substantially rectangular in plan view, and a vehicle width direction central portion at the front of the sub base member 24 is formed with a tongue 25 by cutting away a front end portion on either side of the vehicle width direction central portion.

The tongue 25 is bent at its base such that the tongue 25 is disposed at a lower position (further toward the vehicle lower side) than the upper face 24A of the sub base member 24. A through hole (not illustrated in the drawings) that has a circular profile in plan view is formed through the center of the tongue 25. A shaft 97B of a weld bolt 97 (see FIG. 2) is inserted through the through hole, and a head 97A of the weld bolt 97 is fixed by welding to the upper face of the tongue 25 at the periphery of the through hole.

A central side of a front end portion of the stereo camera device 60 is fastened to the sub base member 24 by the single weld bolt 97 and a single nut 98 (see FIG. 2). Namely, the stereo camera device 60 is fastened to the sub base member 24 and the base member 22 at one location at the front of the stereo camera device 60 and at two locations at the rear of the stereo camera device 60 to give a total of three locations (three points).

A pair of left and right anchoring portions 26 that anchor a pair of left and right anchor claws 78 provided to a main cover 70, described later, are formed at both vehicle width direction end portions of the base member 22 (the right anchor claw 78 and the right anchoring portion 26 are omitted from illustration in the drawings). The anchoring portions 26 are each open on a vehicle front side, and are formed substantially in the shape of the letter J as viewed from the side. The anchor claws 78 are inserted into the anchoring portions 26 from the vehicle front so as to be anchored to the anchoring portions 26.

At both left and right sides of the tongue 25, a front end portion 24B of the sub base member 24 is bent toward the vehicle lower side, and anchoring holes 28, serving as anchoring portions that anchor together with anchor claws 79 provided to a main cover 70, are respectively formed to the front end portions 24B. Each anchoring hole 28 is formed in a substantially rectangular shape with its length direction in the vehicle width direction when viewed front-on, and the anchor claws 79 are inserted into the anchoring holes 28 from the vehicle front so as to be anchored to the anchoring holes 28.

As illustrated in FIG. 2 to FIG. 6, the sensor unit 20 includes the locator/telephoto camera device 30 and the housing 50. The locator/telephoto camera device 30 serves as a sensor device in which a locator camera 42 and a telephoto camera 44, described later, are attached to a device body 30A. The housing 50 serves as a support member that houses (covers) at least the periphery of a lower portion of the locator/telephoto camera device 30 (an electronic board 40, described later) from the vehicle lower side.

Figure 6:
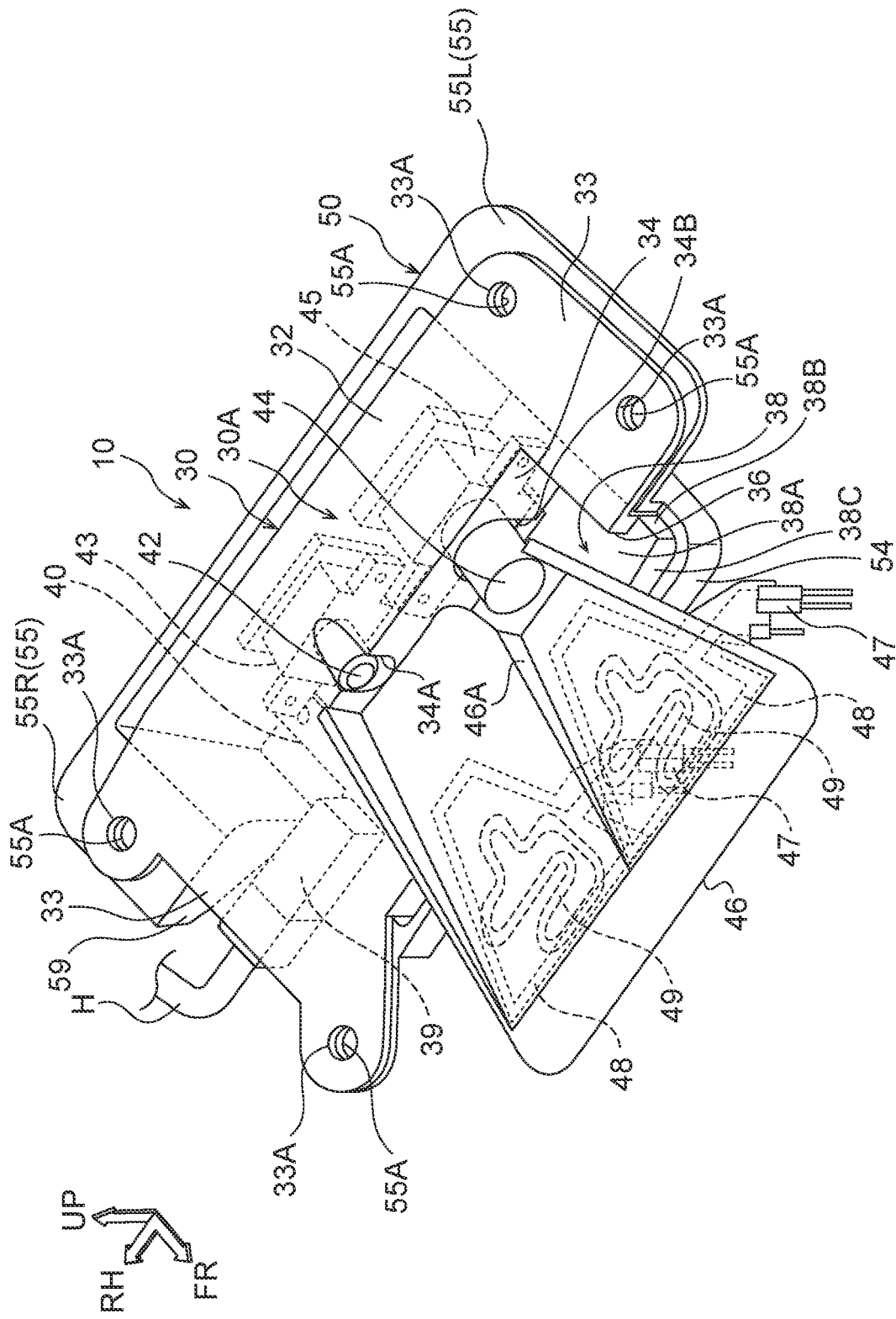
FIG. 6 is a perspective view illustrating a locator/telephoto camera device and a housing configuring a sensor mount structure according to an exemplary embodiment.

The device body 30A of the locator/telephoto camera device 30 is formed from a metal such as an aluminum alloy, and includes a top wall 32, a front wall 34, and side walls 36 (see FIG. 6). Namely, the device body 30A lacks a rear wall and a bottom wall, and is open toward the vehicle rear and the vehicle lower side. The locator camera 42 and the telephoto camera 44 can thus be installed through the open sides.

Figure 5:
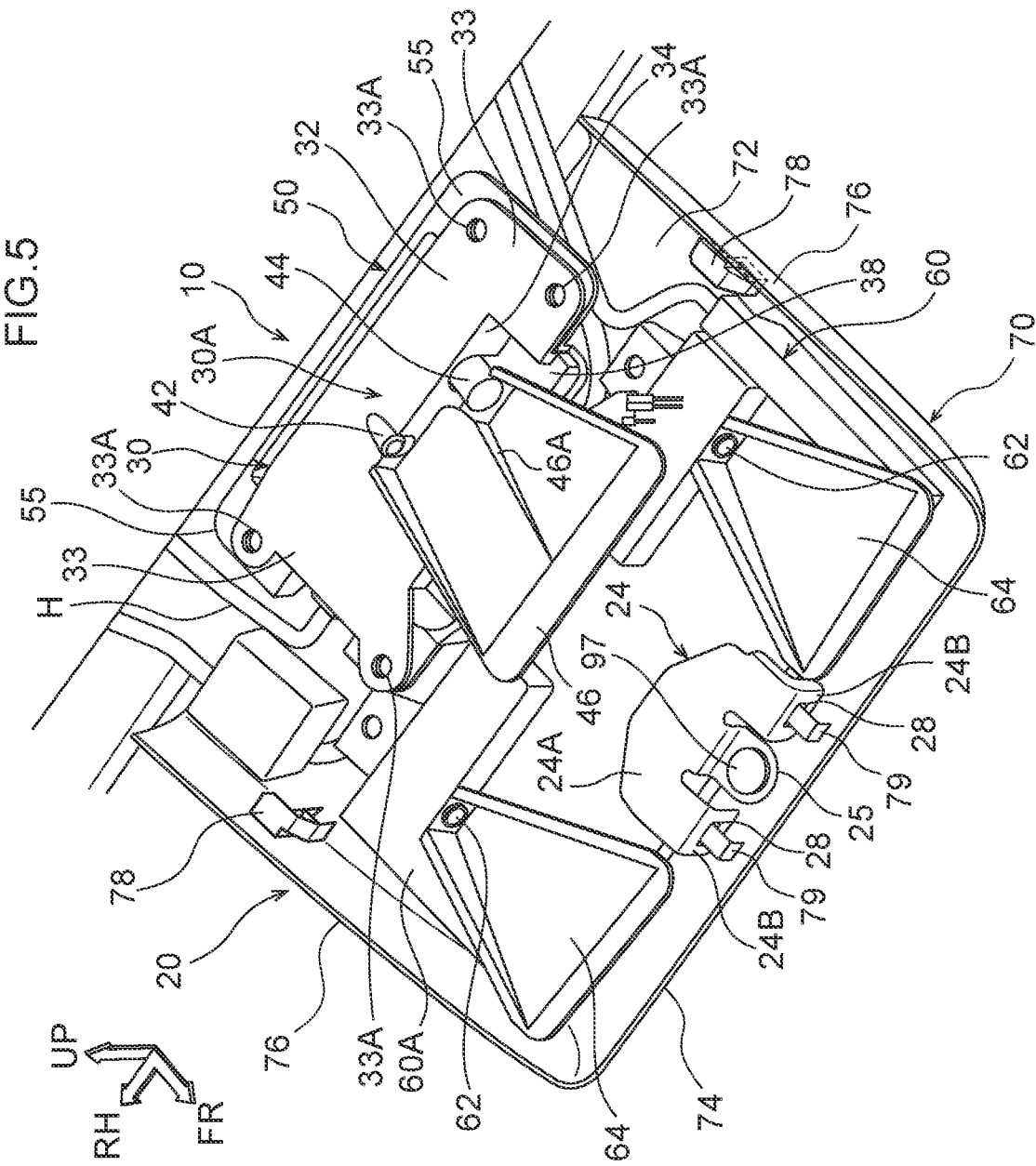
FIG. 5 is a perspective view illustrating a sensor mount structure according to an exemplary embodiment as viewed from an upper side of a vehicle when a base member has been removed.

As illustrated in FIG. 3, FIG. 5, and FIG. 6, both left and right end portions of the top wall 32 are formed with integral flanges 33 sticking out further toward the vehicle width direction outer sides than the side walls 36 and further toward the vehicle front than the front wall 34. Each flange 33 is formed with through holes 33A that have circular profiles in plan view to allow insertion of the weld bolts 96 provided to the base member 22. The through holes 33A are separated from each other in the vehicle front-rear direction.

A protruding ledge 38 that has the same width as the front wall 34 and that sticks out toward the vehicle front is formed integrally to a lower end portion of the front wall 34. The protruding ledge 38 includes an upper wall 38A that is contiguous to the front wall 34, side walls 38B, and a front wall 38C that is contiguous to the upper wall 38A and the side wall 38B (see FIG. 6). A front end portion of the protruding ledge 38 sticks out further toward the vehicle front than front end portions of the flanges 33.

In the device body 30A of the locator/telephoto camera device 30, the locator camera 42 and the telephoto camera 44 are retained side-by-side in the vehicle width direction. The locator camera 42 serves a sensor used for driving assistance (automated driving) and detects surroundings information (information regarding positions, directions, distances, and the like at least a region ahead) of the vehicle 12. The telephoto camera 44 serves as a sensor, likewise used for driving assistance (automated driving).

Note that the locator camera 42 and the telephoto camera 44 configure a pair of left and right cameras that detect different surroundings information to that detected by a stereo camera 62, described later, which allows the respective cameras to be disposed close to one another. The locator camera 42 is disposed at a higher position (further toward the vehicle upper side) than the telephoto camera 44.

As illustrated in FIG. 6, the locator camera 42 and the telephoto camera 44, including respective camera bodies 43, 45, have differing lengths (focal distances) in the vehicle front-rear direction. Namely, the telephoto camera 44 (including the camera body 45) is formed longer in the vehicle front-rear direction than the locator camera 42 (including the camera body 43).

The camera body 43 of the locator camera 42 and the camera body 45 of the telephoto camera 44 are attached and fixed to the front wall 34 of the device body 30A with screws or the like. The front wall 34 is therefore formed with an exposing hole 34A that exposes the locator camera 42 toward the vehicle front and an exposing hole 34B that exposes the telephoto camera 44 toward the vehicle front, located side-by-side in the vehicle width direction.

Note that since the locator camera 42 is disposed at a higher position than the telephoto camera 44, the exposing hole 34A may be formed by cutting away part of the front side of the top wall 32. The locator camera 42 and the telephoto camera 44 are electrically connected to and operated through the common (single) electronic board 40.

The electronic board 40 is formed in a substantially rectangular flat plate shape, and its peripheral edge is attached using screws or the like to the side wall 36 and the protruding ledge 38 of the device body 30A. The electronic board 40 may therefore be understood as being a bottom wall of the locator/telephoto camera device 30. Note that a vehicle front-rear direction substantially central portion of a right end portion (one vehicle width direction end portion) of the electronic board 40 is provided with a connector 39 that connects the electronic board 40 to wiring H (see FIG. 6).

As illustrated in FIG. 2 to FIG. 6, a rear end portion of a view angle hood member (referred to hereafter as "hood member") 46 formed from a resin material such as polypropylene (PP) is attached to the upper wall 38A of the protruding ledge 38 of the device body 30A. The hood member 46 is formed in an isosceles trapezoidal shape that becomes wider in the vehicle width direction on progression toward the vehicle front in plan view. At least half of the hood member 46 sticks out to the vehicle front of the front end portion of the protruding ledge 38.

Both left and right sides of a rear end portion of the hood member 46 are formed with integral anchor claws (not illustrated in the drawings), and both left and right sides of a rear end portion of the upper wall 38A of the protruding ledge 38 are formed with anchoring holes (not illustrated in the drawings). Namely, the hood member 46 is attached to the upper wall 38A of the protruding ledge 38 by anchor-fitting the anchor claws into the anchoring holes.

Moreover, since the telephoto camera 44 is disposed at a lower position (further toward the vehicle lower side) than the locator camera 42, the height of the hood member 46 changes at a vehicle width direction substantially central portion, such that the hood member 46 is higher on the locator camera 42 side and lower on the telephoto camera 44 side. Namely, a step 46A is formed at a vehicle width direction substantially central portion of the hood member 46.

Note that an upper face of a front end portion of the hood member 46 is configured so as not to contact (be non-contact with) the inner surface of the front windshield glass 14. The hood member 46 is colored black, for example, in order to prevent or suppress reflection of light that has passed through the front windshield glass 14 (capture of glare by the locator camera 42 and the telephoto camera 44).

Moreover, as illustrated in FIG. 2 and FIG. 6, a lower face of the hood member 46 is provided with heaters 48, serving as a heat generating bodies, and an insulating sheet (not illustrated in the drawings) serving as an insulating member interposed between the lower face and the heaters 48. Specifically, a right half of the lower face of the hood member 46, at the vehicle front of the locator camera 42, and a left half of the lower face of the hood member 46, at the vehicle front of the telephoto camera 44, are provided with respective isosceles trapezoidal shaped heaters 48 that become broader in the vehicle width direction on progression toward the vehicle front in plan view.

A heater wire 49 is provided inside each heater 48. A left end portion (vehicle width direction other end portion) of each heater 48 is provided with a connector 47 used to connect the heater wire 49 to wiring (not illustrated in the drawings). Note that the hood member 46 is not limited to a configuration provided separately to the protruding ledge 38 of the device body 30A of the locator/telephoto camera device 30, and for example, the hood member 46 may be integrally formed to the base member 22.

Namely, the hood member 46 may be formed from a metal such as an aluminum alloy, integrally with the base member 22. In such cases, the heaters 48 may be provided (affixed) to the lower face of the hood member 46 without interposing an insulating sheet therebetween. Moreover, there is no need to form anchoring holes in the upper wall 38A of the protruding ledge 38 of the device body 30A of the locator/telephoto camera device 30.

As illustrated in FIG. 2, FIG. 3, and FIG. 6 to FIG. 8, the housing 50 is formed from a metal such as an aluminum alloy, and includes a bottom wall 52, and a front wall 54, rear wall 56, and left and right side walls 58 that rise up integrally from the periphery of the bottom wall 52. Namely, the housing 50 is formed in a shape of a casing open toward the vehicle upper side.

Flanges 55 are integrally formed so as to stick out from upper end portions of the left and right side walls 58 toward the vehicle width direction outer sides in substantially rectangular shapes in plan view, so as to be able to overlap the flanges 33 of the locator/telephoto camera device 30 (device body 30A). Note that in the following explanation, when distinguishing between the left and right of the left and right side walls 58 and the left and right flanges 55, the numerals are suffixed with either L or R.

Through holes 55A that are circular in plan view are formed separated from each other in the vehicle front-rear direction in each of the flanges 55. The through holes 55A allow the weld bolts 96 provided to the base member 22 to pass through. Namely, when superimposing the flanges 55 of the housing 50 on the flanges 33 of the locator/telephoto camera device 30 (device body 30A) to be jointly fastened to the base member 22, the through holes 33A of the flanges 33 and the through holes 55A of the flanges 55 are placed in communication with each other (see FIG. 6).

The housing 50 houses at least the periphery of a lower portion (the electronic board 40) of the locator/telephoto camera device 30, in a state in which the flanges 55 of the housing 50 are superimposed on the flanges 33 of the locator/telephoto camera device 30 (device body 30A) (see FIG. 6). Note that a space (gap) S is formed between outer faces of the locator/telephoto camera device 30 (device body 30A and electronic board 40) housed in the housing 50 and inner faces of the housing 50 (see FIG. 2, FIG. 13).

More specifically, spaces S are respectively formed between a lower face of the electronic board 40 and a bottom face within the housing 50, between the rear face of the locator camera 42 (camera body 43) and the rear face of the telephoto camera 44 (camera body 45) and a rear face within the housing 50, between an outer face of the side wall 36 of the locator/telephoto camera device 30 (device body 30A) and a side face within the housing 50, and between a front face of the front wall 38C of the protruding ledge 38 and a front face within the housing 50.

Figure 8:
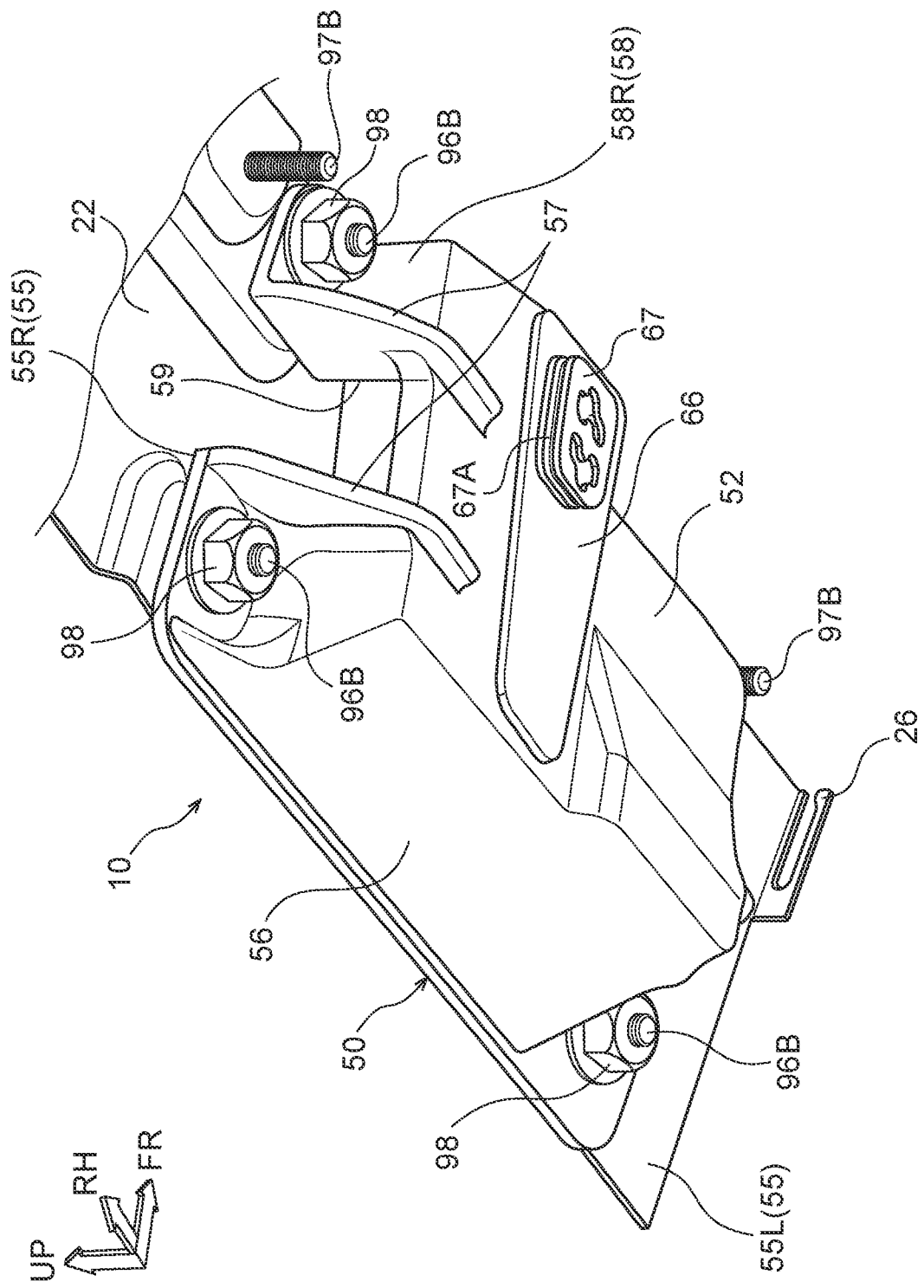
FIG. 8 is a perspective view illustrating a housing configuring a sensor mount structure according to an exemplary embodiment as viewed from the lower right.

Moreover, as illustrated in FIG. 6 and FIG. 8, a notch 59, serving as an opening to allow the connector 39 provided to the electronic board 40 of the locator/telephoto camera device 30 housed in the housing 50 to project to the vehicle width direction outer side, is formed in the right side wall 58R and the right flange 55R, between the through holes 55A that are separated from each other in the vehicle front-rear direction.

Note that the opening formed in the housing 50 is not limited to the notch 59, and, for example, the opening may be configured by a hole (not illustrated in the drawings) formed solely in the right side wall 58R or a hole (not illustrated in the drawings) straddling both the right side wall 58R and a base-side portion of the right flange 55R, as long as the connector 39 is able to project out.

Figure 7:
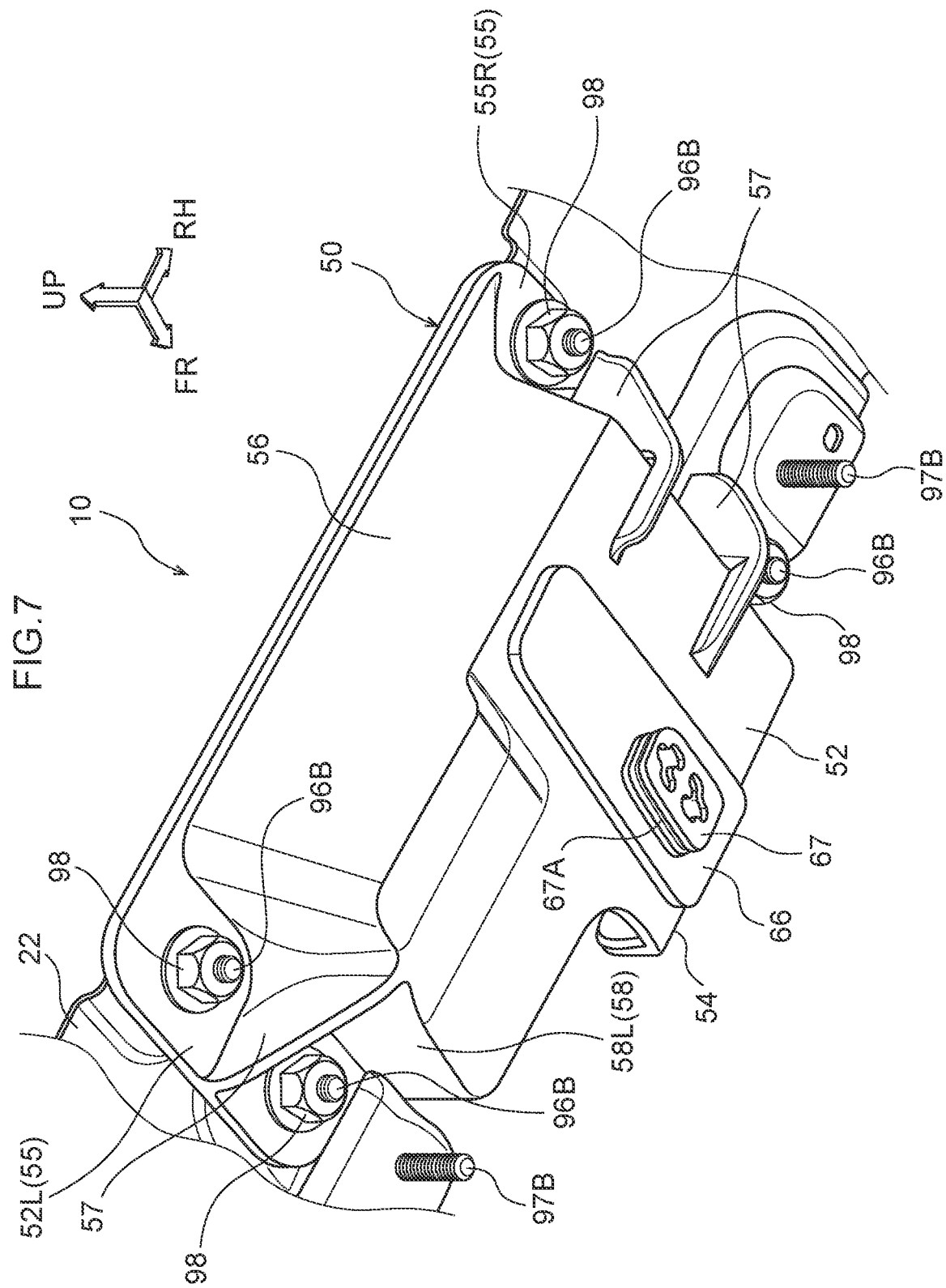
FIG. 7 is a perspective view illustrating a housing configuring a sensor mount structure according to an exemplary embodiment as viewed from the lower left.

Moreover, a pair of front and rear ribs 57 are integrally formed to reinforce the right flange 55R that is interrupted in the front-rear direction by the notch 59. The ribs 57 are formed extending from a lower face of the interrupted right flange 55R at the sides of the notch 59 (peripheral edges of the notch 59) to an outer face of the right side wall 58R and an outer face of the bottom wall 52. As illustrated in FIG. 7, a rib 57 is also integrally formed extending from a lower face on a vehicle front-rear direction substantially central side of the left flange 55L to an outer face of the left side wall 58L so as to reinforce the left flange 55L.

Figure 9:
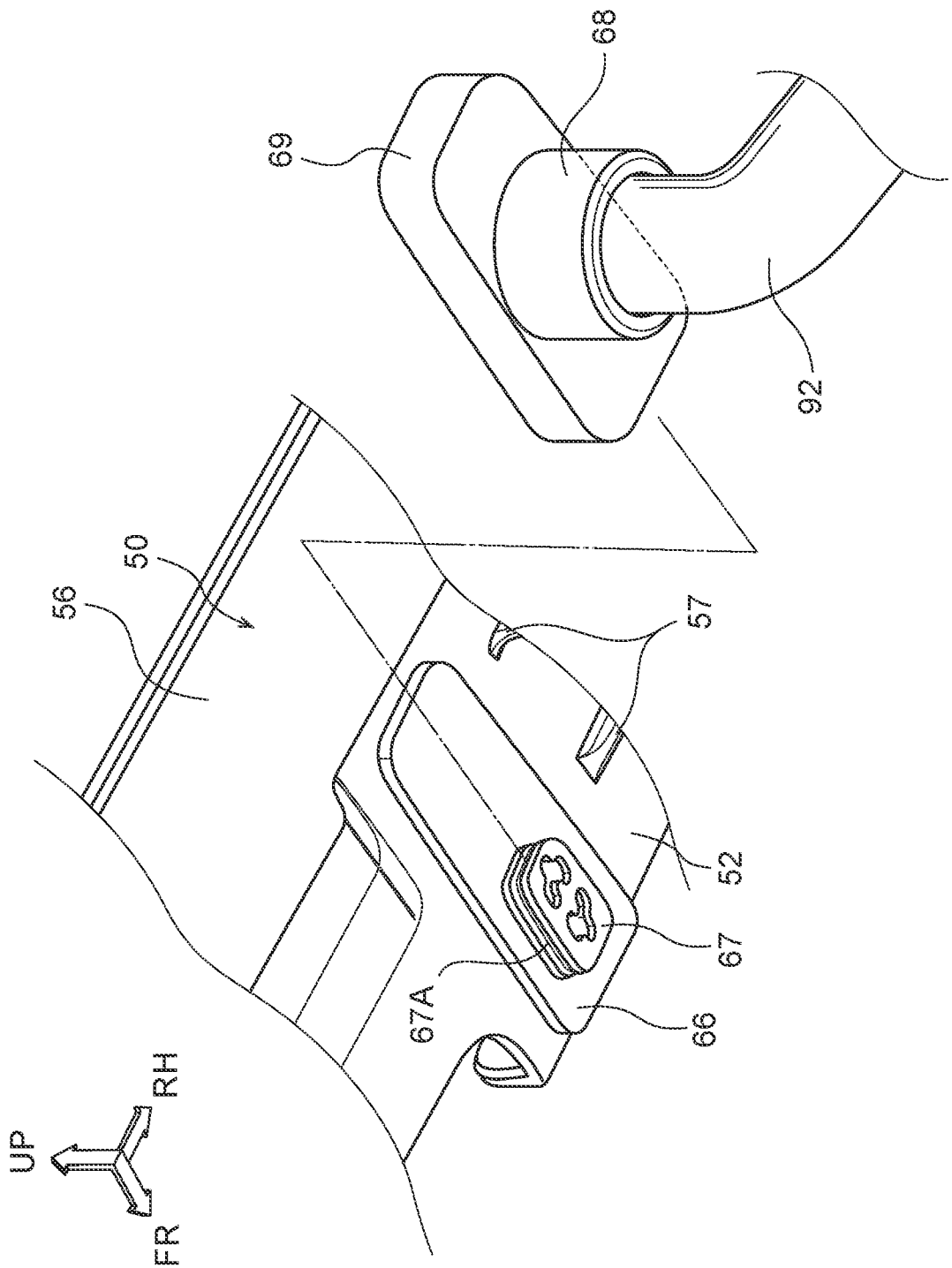
FIG. 9 is a perspective view illustrating a process to attach an electronic interior mirror to a housing configuring a sensor mount structure according to an exemplary embodiment.

Moreover, as illustrated in FIG. 7 to FIG. 9, a mirror bracket 66 is provided to a vehicle width direction substantially central portion of a lower face of the bottom wall 52 in order to attach the electronic interior mirror 90. The mirror bracket 66 is long in the vehicle front-rear direction and short in the vehicle width direction (has its length direction in the vehicle front-rear direction), so as to give a substantially rectangular flat plate shape in bottom face view. A fitted-to portion 67 that has a substantially rectangular shape in bottom face view projects out integrally from a lower face of a front end portion of the mirror bracket 66 for attachment of a ball joint 68.

Figure 10:
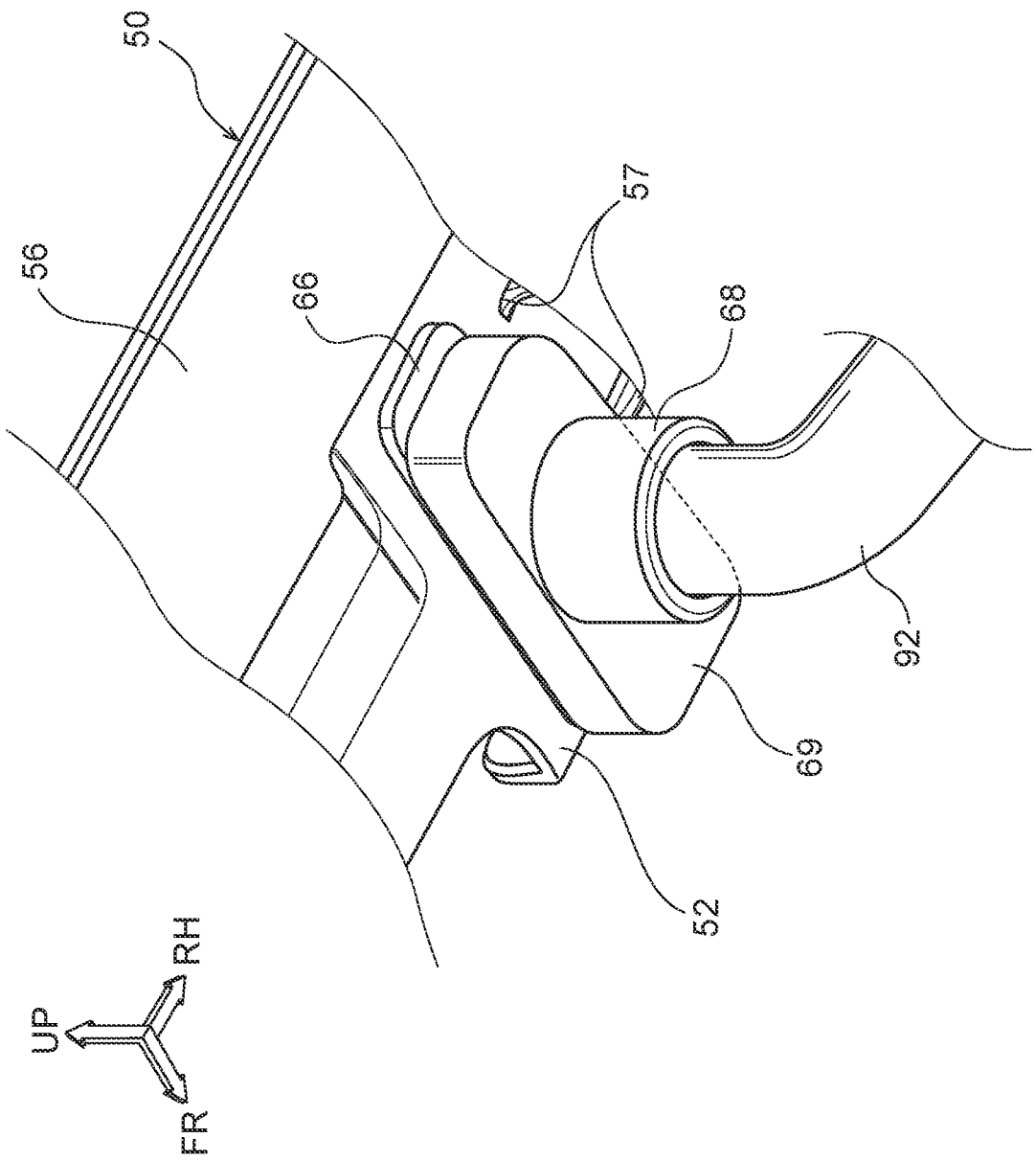
FIG. 10 is a perspective view illustrating a state in which an electronic interior mirror has been attached to a housing configuring a sensor mount structure according to an exemplary embodiment.

A groove 67A is formed running along the vehicle front-rear direction at least at a side face of the fitted-to portion 67 that faces toward the vehicle width direction outer side. As illustrated in FIG. 9 and FIG. 10, a fitting portion 69 extending along the vehicle front-rear direction and formed at an upper end portion of the ball joint 68 (see FIG. 3 also) slides in from the vehicle rear so as to fit together with the groove 67A.

The ball joint 68 (electronic interior mirror 90) is thus attached to the mirror bracket 66. Note that as illustrated in FIG. 2, a lower end portion 92B of an arm member 92 is attached to a length direction center portion of a reverse side (side that does not function as a mirror) of the electronic interior mirror 90, and a spherical upper end portion 92A of the arm member 92 is fitted into the ball joint 68, such that the electronic interior mirror 90 is supported by the housing 50 through the ball joint 68.

As illustrated in FIG. 2 to FIG. 5, the sensor unit 20 includes the stereo camera device 60. The stereo camera device 60 includes the pair of left and right stereo cameras 62, serving as a pair of left and right sensors that detect surroundings information (at least information regarding positions, directions, distances, and the like ahead of the vehicle) for the vehicle 12 that is different from the surroundings information collected by the locator/telephoto camera device 30. The stereo camera device 60 is disposed further toward the vehicle front than the housing 50.

Namely, as described above, a front end portion of the stereo camera device 60 is fastened to and supported by the sub base member 24 using the weld bolts 97 and the nuts 98, and both left and right sides of a rear end portion of the stereo camera device 60 are fastened to and supported by the base member 22 using the weld bolts 97 and the nuts (not illustrated in the drawings).

As illustrated in FIG. 2, the rear end portion of the stereo camera device 60 overlaps with a front portion of the hood member 46 in the vehicle front-rear direction in side view. In other words, the front portion of the hood member 46 covers a vehicle width direction substantially central portion of the rear end portion of the stereo camera device 60 from the vehicle upper side.

The front wall 54 of the housing 50 is thus disposed close to a rear wall 60B (see FIG. 2) of a device body 60A of the stereo camera device 60. Note that an isosceles trapezoidal shaped view angle hood 64 that becomes wider in the vehicle width direction on progression toward the vehicle front in plan view is integrally formed to the device body 60A of the stereo camera device 60 at the vehicle front of each of the stereo cameras 62.

Moreover, as illustrated in FIG. 1, FIG. 2, FIG. 4, and FIG. 5, front portions of the stereo camera device 60 and the housing 50 are covered from the vehicle lower side by the main cover 70. The main cover 70 is formed from a resin material such as polycarbonate (PC), and includes a rectangular flat plate shaped bottom wall 72, a front wall 74 that curves in a circular arc shaped cross-section protruding toward the vehicle lower side so as to extend from a front end portion of the bottom wall 72 toward the vehicle front and upper side, and left and right side walls 76 that are tall enough to house the front portions of the stereo camera device 60 and the housing 50.

The pair of left and right anchor claws 78 are provided extending toward the vehicle rear at vehicle front-rear direction substantially central portions of the bottom wall 72 alongside the left and right side walls 76. The anchor claws 78 are inserted into the respective anchoring portions 26 formed in the base member 22 from the vehicle front and are anchored to the anchoring portions 26. The pair of left and right anchor claws 79 are provided extending toward the vehicle rear at an inner face on the vehicle width direction center side of the front wall 74. The anchor claws 79 are inserted into the respective anchoring holes 28 formed in the sub base member 24 from the vehicle front and are anchored to the anchoring holes 28.

Namely, the main cover 70 is attached to the base member 22 and the sub base member 24 by inserting and anchoring the anchor claws 78 and the anchor claws 79 to the respective anchoring portions 26 and anchoring holes 28. As illustrated by the single dot-dashed lines in FIG. 2, a lower end portion (boundary between the bottom wall 72 and the front wall 74) 73 of the main cover 70 does not project to the vehicle lower side of a line of sight Y of an occupant (driver) that passes a lower peripheral edge 90B of the electronic interior mirror 90 (securing the field of view).

Moreover, as illustrated in FIG. 1 and FIG. 2, an overhead console 16 including an interior light (not illustrated in the drawings) and the like is disposed at the vehicle rear of the housing 50 (sensor unit 20) and at the vehicle lower side of a roof header 18. A sub cover 80, serving as a cover member that covers between the main cover 70 and the overhead console 16 (remainder of the rear portion of the housing 50), is provided at the vehicle rear of the main cover 70 and at the vehicle front of the overhead console 16.

Figure 11:
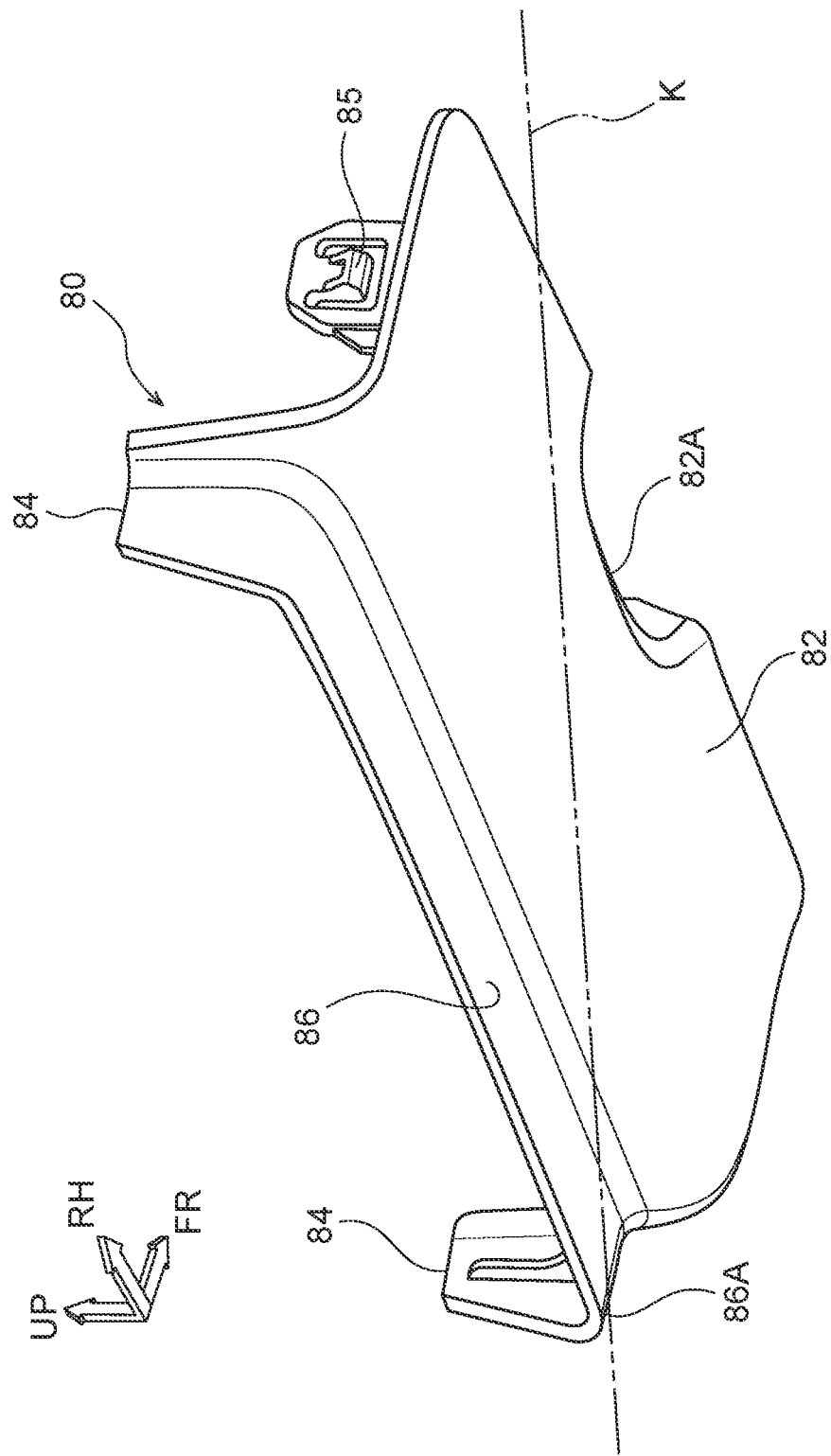
FIG. 11 is a perspective view illustrating a sub cover configuring a sensor mount structure according to an exemplary embodiment as viewed from below.
Figure 12:
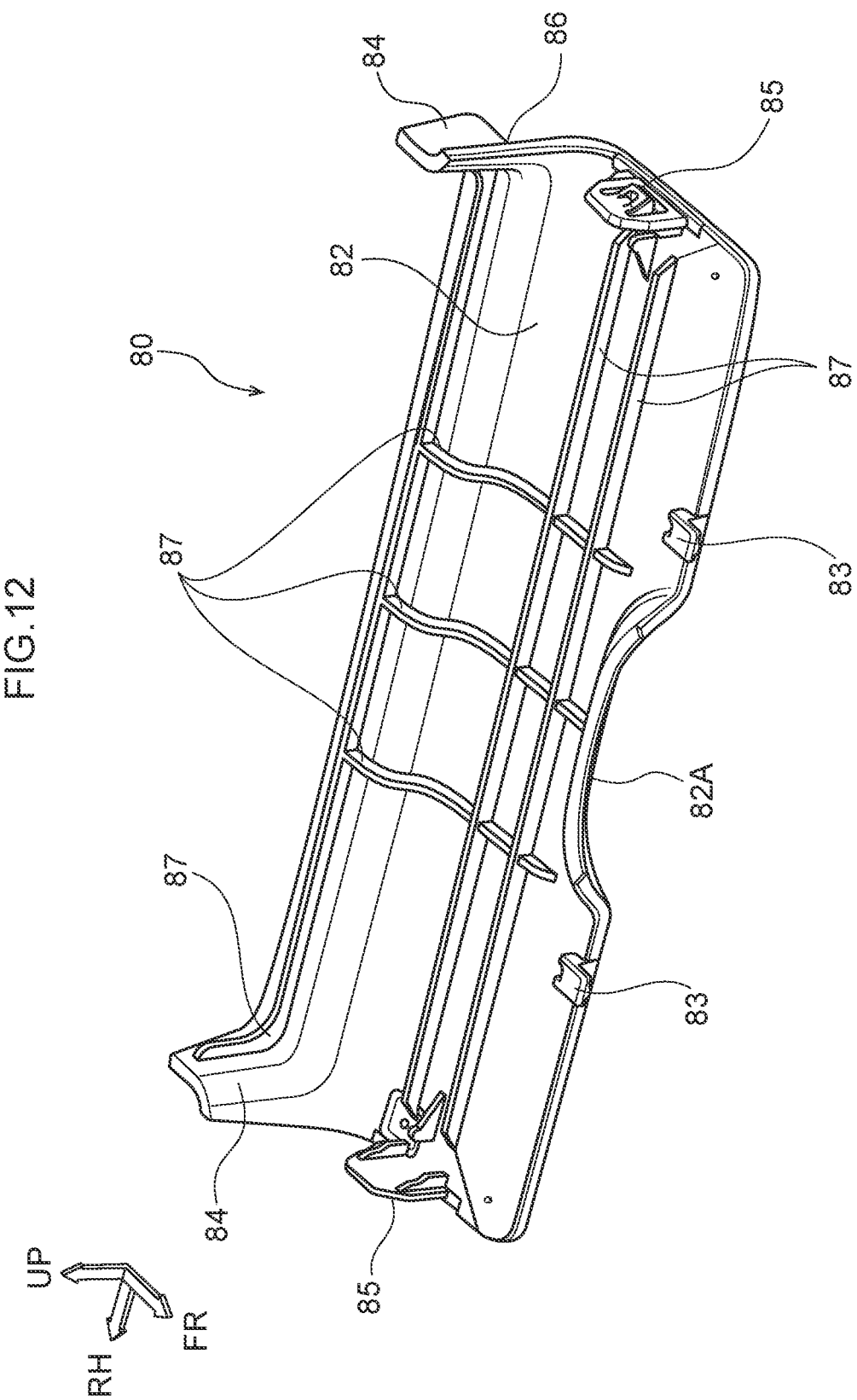
FIG. 12 is a perspective view illustrating a sub cover configuring a sensor mount structure according to an exemplary embodiment as viewed from above.

As illustrated in FIG. 11 and FIG. 12, the sub cover 80 is formed from a resin material such as polycarbonate (PC), and includes a substantially flat plate shaped bottom wall 82 and left and right side walls 84 extending integrally from both left and right end portions of a rear end portion of the bottom wall 82 toward the vehicle upper side. The entirety of the rear end portion of the bottom wall 82 in the vehicle width direction is bent into a substantially L-shaped cross-section profile protruding toward the vehicle upper side in side view. The left and right side walls 84 are bent into substantially L-shaped cross-section profiles protruding toward the vehicle width direction inner side in plan view.

Namely, a step 86 is formed contiguously to the left and right side walls 84 (so as to be disposed at a higher position than the bottom wall 82) at the rear end portion of the bottom wall 82. As illustrated in FIG. 13, the step 86 facilitates entry of fingertips (of the left hand) into a space D between an upper peripheral edge 90A of the electronic interior mirror 90 and the rear end portion of the bottom wall 82 of the sub cover 80 when gripping the upper peripheral edge 90A and a lower peripheral edge 90B with the fingertips at a left end portion of the electronic interior mirror 90.

Specifically, if the vehicle 12 is a right-hand drive vehicle, for example, in plan view, the electronic interior mirror 90 is normally tilted about the lower end portion 92B of the arm member 92, such that a right end portion (one length direction end portion) of the electronic interior mirror 90 is disposed toward the vehicle front side, and a left end portion (other length direction end portion) of the electronic interior mirror 90 is disposed toward the vehicle rear side. This state is illustrated in FIG. 1 and FIG. 13.

Thus, a minimum distance D1 between the upper peripheral edge 90A at the left end portion of the electronic interior mirror 90 and a rear end portion 86A on the left side of the step 86 of the sub cover 80 that faces the upper peripheral edge 90A in the vertical direction is longer than a minimum distance D2 between the upper peripheral edge 90A at a central portion (length direction center portion) and a right end portion of the electronic interior mirror 90 and the bottom wall 82 of the sub cover 80 that faces the upper peripheral edge 90A in the vertical direction. The space D that allows entry of the fingertips of the (left hand of the) driver is thereby formed between the upper peripheral edge 90A at the left end portion of the electronic interior mirror 90 and the rear end portion 86A on the left side of the step 86 of the sub cover 80.

Moreover, a pair of left and right anchor claws 83 (see FIG. 12) are provided projecting toward the vehicle front at a front end portion of the bottom wall 82 of the sub cover 80. The anchor claws 83 are anchored to a rear end portion of the main cover 70. Moreover, both left and right end portions of the bottom wall 82 of the sub cover 80 (in front of the side walls 84) are provided with a pair of left and right anchor claws 85 projecting toward the vehicle upper side. The anchor claws 85 are inserted into and anchored to anchoring holes (not illustrated in the drawings), serving as anchoring portions, formed in the main cover 70.

Accordingly, the anchor claws 83 at the front end portion of the bottom wall 82 are anchored to the rear end portion of the main cover 70, and then the anchor claws 85 at both the left and right end portions of the bottom wall 82 are inserted into and anchored to the anchoring holes in the main cover 70. The sub cover 80 is thereby attached between the main cover 70 and the overhead console 16. Note that plural reinforcing ribs 87 extending in the front-rear direction and left-right direction are integrally formed at appropriate positions on an upper face (non-decorative face) of the sub cover 80.

A notch 82A with a substantially semicircular arc shape toward the vehicle rear in bottom face view is cut into a vehicle width direction central portion of a front end portion of the bottom wall 82 of the sub cover 80 (between the anchor claws 83 provided to the front end portion of the bottom wall 82). Moreover, a notch (not illustrated in the drawings) with a substantially semicircular arc shape toward the vehicle rear in bottom face view is cut into a vehicle width direction central portion of a rear end portion of the bottom wall 72 of the main cover 70.

The notch in the main cover 70 and the notch 82A in the sub cover 80 form an opening through which the ball joint 68 (arm member 92) is exposed. Note that a covering portion 88 with a substantially U-shape in bottom face view (see FIG. 1) may be provided projecting toward the vehicle lower side at a peripheral edge of the notch 82A in the sub cover 80. In such configurations, the covering portion 88 enables the ball joint 68 (arm member 92) to be hidden from the line of sight of an occupant (driver).

Explanation follows regarding operation of the sensor mount structure 10 (sensor unit 20) according to the present exemplary embodiment configured as described above.

The length direction center portion of the reverse side of the electronic interior mirror 90 is attached to the lower end portion 92B of the arm member 92 such that its angle is adjustable. The upper end portion 92A of the arm member 92 is attached at the bottom wall 52 of the housing 50 (mirror bracket 66) through the ball joint 68 and the fitting portion 69.

Note that the housing 50 that houses (covers) part of the locator/telephoto camera device 30 (namely, the periphery of a lower portion including the electronic board 40) is formed in a shape of a casing open toward the vehicle upper side. Support rigidity of the housing 50 with respect to the electronic interior mirror 90 is thereby secured. The housing 50 is fastened jointly with the device body 30A of the locator/telephoto camera device 30 to the base member 22.

Namely, the case shaped housing 50 is provided between the upper end portion 92A of the arm member 92 and the base member 22. This enables the length of the arm member 92 to be reduced in comparison to cases in which, for example, the electronic interior mirror 90 is at the same position but the upper end portion 92A of the arm member 92 is directly attached to the base member 22. This enables vibration of the electronic interior mirror 90 during vehicle travel to be suppressed.

The mirror bracket 66 to which the upper end portion 92A of the arm member 92 is attached is formed in a substantially rectangular flat plate shape with its length direction in the vehicle front-rear direction (so as to be long in the vehicle front-rear direction and short in the vehicle width direction). The vehicle front-rear direction rigidity of the bottom wall 52 including the mirror bracket 66 is thereby increased, enabling vehicle front-rear direction vibration of the electronic interior mirror 90 during vehicle travel to be effectively suppressed.

When the vehicle 12 is a right-hand drive vehicle, for example, as illustrated in FIG. 13, the minimum distance D1 between the upper peripheral edge 90A at the left end portion of the electronic interior mirror 90 and the rear end portion 86A on the left side of the step 86 of the sub cover 80 is longer than the minimum distance D2 between the upper peripheral edge 90A at the central portion and the right end portion of the electronic interior mirror 90 and the bottom wall 82 of the sub cover 80 (the space D is widened in the vertical direction by the step 86).

Thus, the space D allowing the fingertips (of the left hand) to enter at the upper side of the upper peripheral edge 90A at the left end portion of the electronic interior mirror 90 is well-secured. Namely, the angle of the electronic interior mirror 90 can be easily adjusted by the fingertips (of the left hand), even in a configuration in which the electronic interior mirror 90 is attached to the sensor unit 20 provided to the inner surface of the front windshield glass 14 so as to suppress vibration.

The sub cover 80 covers the housing 50 from the vehicle lower side while circumventing the arm member 92. This enables the shape of the sub cover 80 to be simplified in comparison to cases in which the sub cover 80 also covers the arm member 92 from the vehicle lower side, namely, cases in which the covering portion 88 is integrally formed to the sub cover 80.

As described above, the housing 50 houses the periphery of the lower portion of the locator/telephoto camera device 30, including the electronic board 40. This thereby enables effective protection of the electronic board 40, and enables a reduction in the amount of space needed for installation of the locator/telephoto camera device 30.

As described above, the device body 30A of the locator/telephoto camera device 30 is jointly fastened to the base member 22 together with the housing 50. This thereby enables a reduction in the number of weld bolts 96 (number of components) in comparison to cases in which the device body 30A is fastened to the base member 22 separately to the housing 50.

In particular, the device body 30A of the locator/telephoto camera device 30 and the housing 50 are fastened to the base member 22 at four points separated from each other in the vehicle front-rear direction and the vehicle width direction. This enables the electronic interior mirror 90, which is a heavier object than a standard optical mirror (not illustrated in the drawings) to be supported in a state that is better stabilized against vehicle front-rear direction and vehicle width direction vibration than, for example, in cases in which there are only three fastening points.

Moreover, the space (gap) S is formed between the outer faces of the locator/telephoto camera device 30 (device body 30A and electronic board 40) housed inside the housing 50 and the inner faces of the housing 50. Accordingly, load applied to the housing 50 when an occupant (driver) moves the electronic interior mirror 90 can be suppressed or prevented from acting on the locator/telephoto camera device 30 in comparison to cases in which the space S is not formed between the outer faces of the locator/telephoto camera device 30 housed inside the housing 50 and the inner faces of the housing 50. This thereby enables the position (optical axis) of the locator camera 42 and the telephoto camera 44 to be suppressed or prevented from shifting.

Moreover, the notch 59 (opening) to allow the connector 39 provided to the electronic board 40 to project out is formed in the right side wall 58R and the right flange 55R of the housing 50, between the through holes 55A separated from each other in the vehicle front-rear direction.

Accordingly, the layout of the wiring H can be simplified in comparison to cases in which the housing 50 does not include the notch 59 allowing the connector 39 to project out. Moreover, there is no need to, for example, extend a portion of the electronic board 40 so as to extend to the exterior of the housing 50 in order to attach the connector 39, thereby enabling a reduction in size of the electronic board 40.

The pair of front and rear ribs 57 are integrally formed extending from the lower face of the peripheral edge of the notch 59 formed in the right flange 55R to the outer face of the right side wall 58R and the outer face of the bottom wall 52, thereby reinforcing the right flange 55R that is interrupted by the notch 59. This thereby enables a reduction in the rigidity of the housing 50 to be suppressed despite the formation of the notch 59.

The locator/telephoto camera device 30 is configured by the locator camera 42 and the telephoto camera 44, which have different focal distances to each other. Namely, the telephoto camera 44 is formed with a longer length in the vehicle front-rear direction than the locator camera 42. The telephoto camera 44 is disposed at a lower position than the locator camera 42.

Accordingly, even though the locator camera 42 and the telephoto camera 44 have different lengths to each other, both the locator camera 42 and the telephoto camera 44 can be disposed close to the inner surface of the front windshield glass 14, enabling any reduction in the detection performance of surroundings information of the vehicle 12 to be suppressed or prevented (enabling detection performance to be improved).

Moreover, the locator camera 42 and the telephoto camera 44 are electrically connected to the common (single) electronic board 40. This thereby enables the number of components of the sensor unit 20 to be reduced in comparison to cases in which, for example, an electronic board is provided for each camera, enabling manufacturing costs of the sensor unit 20 to be reduced.

Moreover, the protruding ledge 38 (device body 30A) at the vehicle front and lower side of the locator camera 42 and the telephoto camera 44 is provided with the (black-colored) hood member 46. Accordingly, reflection of light that has passed through the front windshield glass 14 (capture of glare by the locator camera 42 and the telephoto camera 44) can be suppressed or prevented in comparison to cases in which the hood member 46 is not provided to the protruding ledge 38 (device body 30A) at the vehicle front and lower side of the locator camera 42 and the telephoto camera 44. This thereby enables any reduction in the detection performance of surroundings information of the vehicle 12 to be further suppressed or prevented.

Moreover, the heaters 48 are provided at the lower face of the hood member 46, with the insulating sheet interposed between the lower face of the hood member 46 and the heaters 48. Anti-fogging performance of the front windshield glass 14 is thus secured. Note that forming the hood member 46 integrally to the base member 22 from a metal such as an aluminum alloy enables efficient transfer of the heat of the heaters 48 from the hood member 46 to the base member 22, thereby enabling the anti-fogging performance of the front windshield glass 14 to be improved.

Moreover, integrally forming the hood member 46 to the base member 22 enables the number of components configuring the locator/telephoto camera device 30 to be reduced in comparison to cases in which the hood member 46 is provided separately to the protruding ledge 38 (device body 30A), thereby enabling a reduction in manufacturing costs.

Moreover, the stereo camera device 60 is disposed further toward the vehicle front than the locator/telephoto camera device 30. The front end portion of the hood member 46 overlaps the vehicle upper side of the rear end portion of the stereo camera device 60 in the vehicle front-rear direction. Namely, the front wall 54 of the housing 50 is disposed close to the rear wall 60B of the device body 60A of the stereo camera device 60.

Accordingly, the vehicle front-rear direction length from the front end portion of the stereo camera device 60 to the rear end portion of the locator/telephoto camera device 30 can be reduced in comparison, for example, to cases in which the rear wall 60B of the stereo camera device 60 is disposed further toward the vehicle front than the front end portion of the hood member 46. Namely, at least the vehicle front-rear direction length of the sensor unit 20 can be reduced, enabling a reduction in the amount of space needed for installation of the locator/telephoto camera device 30 and the stereo camera device 60.

Explanation has been given regarding the sensor mount structure 10 according to the present exemplary embodiment, with reference to the drawings. However, the sensor mount structure 10 according to the present exemplary embodiment is not limited to the configuration illustrated in the drawings, and various design modifications are possible within a range not departing from the spirit of the present disclosure. For example, the display device is not limited to the electronic interior mirror 90, and a standard optical mirror may be applied. Note that in the present exemplary embodiment, the reflection visible in a standard optical mirror is also referred to as an "image".

Moreover, the cover member is not limited to the sub cover 80. For example, in cases in which the main cover 70 is extended toward the vehicle rear side and the sub cover 80 is omitted, the main cover 70 configures the cover member, and in cases in which part of the overhead console 16 is extended to the vehicle front side and the sub cover 80 is omitted, this part of the overhead console 16 configures the cover member.

Moreover, part of the device body 30A of the locator/telephoto camera device 30 (not including the flanges 33) may be configured so as to contact the housing 50. In such cases, heat generated by the locator/telephoto camera device 30 can be released to the housing 50 (the housing 50 can be utilized as a heat dissipating member).

Moreover, the sensors are not limited to the locator camera 42 and the telephoto camera 44, and, for example, sensors employing infrared laser beams or the like may be employed as long as they are capable of detecting surroundings information for the vehicle 12 (as long as the detection performance of surroundings information for the vehicle 12 is improved). Moreover, the hood member 46 is not limited to a black tinted configuration, and, for example, black nonwoven fabric (not illustrated in the drawings) may be affixed to an upper face of the hood member 46.

What is claimed is:

1. A sensor mount structure, comprising:
   a sensor device that detects information regarding at least a region ahead of a vehicle;
   a display device that displays images of at least a region behind the vehicle;
   a support member that covers a part of the sensor device from below and that is attached to a base member provided at an inner surface of a front windshield glass;
   an arm member that has an upper end portion attached to the support member and that has a lower end portion attached to a length direction center portion of the display device; and
   a cover member that covers the support member,
   wherein, when viewed along a line of sight of an occupant, a minimum distance between the cover member and an upper peripheral edge at a length direction end portion of the display device is longer than a minimum distance between the cover member and an upper peripheral edge at the length direction center portion of the display device, and
   wherein the cover member includes a step at a location at which the cover member faces the upper peripheral edge at the length direction end portion of the display device.

2. The sensor mount structure of claim 1, wherein:
   the support member is formed in a shape of a casing including a bottom wall; and
   a bracket having a length direction along a vehicle front-rear direction is provided at the bottom wall, and the upper end portion of the arm member is attached to the bracket.

3. The sensor mount structure of claim 1, wherein the support member is fastened, together with the sensor device, to the base member.

4. The sensor mount structure of claim 3, wherein the support member and the sensor device are fastened to the base member at four points separated from each other in a vehicle front-rear direction and a vehicle width direction.

5. The sensor mount structure of claim 1, wherein the display device is an electronic interior mirror.

6. The sensor mount structure of claim 1, wherein the cover member covers the support member while circumventing the arm member.

7. The sensor mount structure of claim 1, wherein the sensor device comprises a sensor employing a camera or an infrared laser beam.

8. The sensor mount structure of claim 2, wherein the bracket is in a substantially rectangular flat plate shape.

9. The sensor mount structure of claim 6, wherein the cover member covers the support member from the vehicle lower side.

* * * * *